US012475253B2

(12) United States Patent
Rolle et al.

(10) Patent No.: US 12,475,253 B2
(45) Date of Patent: Nov. 18, 2025

(54) AUTOMATING HANDLING OF DATA SUBJECT REQUESTS FOR DATA PRIVACY INTEGRATION PROTOCOLS

(71) Applicant: SAP SE, Walldorf (DE)

(72) Inventors: Benny Rolle, Reinhardshagen (DE); Stefan Hesse, Dresden (DE); Matthias Vogel, Saarbrücken (DE); Carsten Pluder, Spiesen-Elversberg (DE)

(73) Assignee: SAP SE, Walldorf (DE)

( * ) Notice: Subject to any disclaimer, the term of this patent is extended or adjusted under 35 U.S.C. 154(b) by 228 days.

(21) Appl. No.: 18/487,293

(22) Filed: Oct. 16, 2023

(65) Prior Publication Data

US 2025/0124160 A1  Apr. 17, 2025

(51) Int. Cl.
*G06F 21/62* (2013.01)
*H04L 41/5074* (2022.01)

(52) U.S. Cl.
CPC ...... *G06F 21/6245* (2013.01); *H04L 41/5074* (2013.01)

(58) Field of Classification Search
None
See application file for complete search history.

(56) References Cited

U.S. PATENT DOCUMENTS

| | | |
|---|---|---|
| 17,186 A | 5/1857 | Atwater |
| 17,457 A | 6/1857 | Tidgewell |
| 7,308,704 B2 | 12/2007 | Vogel et al. |
| 7,350,237 B2 | 3/2008 | Vogel et al. |
| 8,566,193 B2 | 10/2013 | Singh et al. |
| 8,874,551 B2 | 10/2014 | Rosjat et al. |
| 9,149,407 B2 | 10/2015 | Hesse et al. |
| 9,405,429 B1 | 8/2016 | Gopalakrishnan |
| 9,569,869 B2 | 2/2017 | Hesse et al. |
| 9,904,796 B2 | 2/2018 | Pluder et al. |
| 9,996,592 B2 | 6/2018 | Hengstler et al. |
| 10,140,453 B1 | 11/2018 | Fridakis |

(Continued)

OTHER PUBLICATIONS

U.S. Appl. No. 18/049,063, Hesse et al., filed Oct. 24, 2022.

(Continued)

*Primary Examiner* — Philip J Chea
*Assistant Examiner* — James Ross Hollister
(74) *Attorney, Agent, or Firm* — Fish & Richardson P.C.

(57) ABSTRACT

The present disclosure involves systems, software, and computer implemented methods for automating handling of data subject requests for data privacy integration protocols. One example method includes receiving a ticket for performing a data privacy integration protocol for a data subject. A work package that includes a work package parameter that is based on a ticket parameter is provided to responder applications. Processing of the work package by responder applications includes determining, for at least one object associated with the data subject, purposes associated with the object. The responder application determines, for each purpose, a purpose setting that corresponds to the work package parameter. The responder application processes the work package based on the work package parameter and the purpose settings and provides feedback to a data privacy integration service, which processes the feedback, to continue the data privacy integration protocol for the ticket.

20 Claims, 4 Drawing Sheets

(56) References Cited

U.S. PATENT DOCUMENTS

| | | | |
|---|---|---|---|
| 10,552,642 B2 | 2/2020 | Rolle et al. |
| 10,839,099 B2 | 11/2020 | Vogel et al. |
| 10,909,222 B1 | 2/2021 | Fregly et al. |
| 11,042,654 B2 | 6/2021 | Nos et al. |
| 11,481,513 B2 | 10/2022 | Rolle |
| 11,494,546 B2 | 11/2022 | Rolle |
| 11,514,065 B2 | 11/2022 | Rolle |
| 11,550,781 B2 | 1/2023 | Rolle et al. |
| 11,657,034 B2 | 5/2023 | Rolle |
| 11,714,828 B2 | 8/2023 | Rolle et al. |
| 11,741,237 B2 | 8/2023 | Loch et al. |
| 2008/0174425 A1 | 7/2008 | Torning |
| 2009/0210394 A1 | 8/2009 | Saravanan et al. |
| 2009/0288062 A1 | 11/2009 | Lowry et al. |
| 2012/0036507 A1 | 2/2012 | Jonnala et al. |
| 2012/0246122 A1* | 9/2012 | Short ............... G06F 16/20 707/694 |
| 2013/0055278 A1 | 2/2013 | Zaitsev |
| 2013/0347064 A1 | 12/2013 | Aissi |
| 2014/0059458 A1 | 2/2014 | Levien et al. |
| 2014/0172496 A1 | 6/2014 | Rosjat et al. |
| 2014/0267770 A1 | 9/2014 | Gervautz et al. |
| 2014/0364983 A1 | 12/2014 | Bildmayer et al. |
| 2015/0113459 A1 | 4/2015 | Hengstler et al. |
| 2016/0112438 A1 | 4/2016 | Hengstler et al. |
| 2016/0148143 A1* | 5/2016 | Anderson ......... G06Q 10/06316 705/7.26 |
| 2017/0006135 A1 | 1/2017 | Siebel et al. |
| 2017/0270163 A1 | 9/2017 | Christoph et al. |
| 2018/0101164 A1 | 4/2018 | Noetzelmann et al. |
| 2019/0005210 A1 | 1/2019 | Wiederspohn et al. |
| 2019/0018985 A1* | 1/2019 | Rolle ............... G06F 21/71 |
| 2019/0236334 A1 | 8/2019 | Babushkin |
| 2020/0012978 A1 | 1/2020 | Brannon et al. |
| 2020/0019728 A1 | 1/2020 | Rolle |
| 2020/0117824 A1* | 4/2020 | Upadhyay ......... G06F 16/258 |
| 2020/0184087 A1 | 6/2020 | Nos et al. |
| 2020/0364369 A1 | 11/2020 | Brannon et al. |
| 2021/0200902 A1 | 7/2021 | Brannon et al. |
| 2021/0350022 A1 | 11/2021 | Brannon et al. |
| 2022/0035952 A1 | 2/2022 | Brannon et al. |
| 2022/0043917 A1 | 2/2022 | Rolle |
| 2022/0050834 A1 | 2/2022 | Rolle et al. |
| 2022/0121777 A1 | 4/2022 | Brannon et al. |
| 2022/0207429 A1 | 6/2022 | Haribhakti et al. |
| 2022/0277023 A1* | 9/2022 | Rolle ............... G06Q 30/04 |
| 2022/0277103 A1 | 9/2022 | Brannon et al. |
| 2022/0357992 A1 | 11/2022 | Karpovsky et al. |
| 2023/0004546 A1 | 1/2023 | Mounidevy et al. |
| 2023/0081785 A1 | 3/2023 | Zhang |
| 2023/0086609 A1* | 3/2023 | Grenet ............... G06N 20/00 700/19 |
| 2023/0176894 A1 | 6/2023 | Rolle et al. |
| 2023/0177180 A1 | 6/2023 | Rolle |
| 2023/0177182 A1 | 6/2023 | Rolle et al. |
| 2023/0177183 A1 | 6/2023 | Rolle et al. |
| 2023/0177186 A1 | 6/2023 | Ighoroje et al. |
| 2023/0177187 A1 | 6/2023 | Vogel et al. |
| 2023/0177188 A1 | 6/2023 | Vogel et al. |
| 2023/0177189 A1 | 6/2023 | Ighoroje et al. |
| 2023/0177194 A1 | 6/2023 | Rolle et al. |
| 2023/0177206 A1 | 6/2023 | Rolle et al. |
| 2023/0177213 A1 | 6/2023 | Rolle et al. |
| 2023/0179602 A1 | 6/2023 | Rolle et al. |
| 2023/0185938 A1 | 6/2023 | Schmidt et al. |
| 2023/0214521 A1 | 7/2023 | Amico |
| 2023/0247034 A1 | 8/2023 | Vogel et al. |
| 2024/0184895 A1 | 6/2024 | Vogel et al. |
| 2024/0386106 A1 | 11/2024 | Sethia et al. |
| 2024/0427899 A1 | 12/2024 | Hulick, Jr. et al. |
| 2025/0013602 A1 | 1/2025 | Hesse et al. |
| 2025/0013778 A1 | 1/2025 | Rolle et al. |
| 2025/0123854 A1 | 4/2025 | Rolle et al. |
| 2025/0124051 A1 | 4/2025 | Rolle et al. |
| 2025/0124151 A1 | 4/2025 | Vogel |

OTHER PUBLICATIONS

U.S. Appl. No. 18/073,142, Rolle, filed Dec. 1, 2022.
U.S. Appl. No. 18/073,164, Rolle et al., filed Dec. 1, 2022.
U.S. Appl. No. 18/074,745, Vogel et al., filed Dec. 5, 2022.
U.S. Appl. No. 18/077,476, Rolle et al., filed Dec. 8, 2022.
U.S. Appl. No. 18/077,493, Rolle et al., filed Dec. 8, 2022.
U.S. Appl. No. 18/347,029, Rolle et al., filed Jul. 5, 2023.
U.S. Appl. No. 18/347,065, Hesse et al., filed Jul. 5, 2023.
Sap.com [online], "SAP Master Data Governance" Sep. 2022, retrieved on Oct. 16, 2023, retrieved from URL <https://www.sap.com/products/technology-platform/master-data-governance.html>, 14 pages.
U.S. Appl. No. 18/487,283, Vogel et al., Identifying Forgotten Data Privacy Protocol Relevant Data Objects, filed Oct. 16, 2023, 51 pages.
U.S. Appl. No. 18/487,347, Rolle et al., Semantic Responder Dependencies in Integrated End of Purpose Protocols, filed Oct. 16, 2023, 56 pages.
U.S. Appl. No. 18/487,365, Rolle et al., Landscape Reconfiguration Based on Cross-System Data Stocktaking, filed Oct. 16, 2023, 65 pages.
Wikipedia.org [online] "Attribute-value system" created on Oct. 2006, retrieved on Oct. 17, 2023, retrieved from URL <https://en.wikipedia.org/wiki/Attribute%E2%80%93value_system>, 3 pages.
Wikipedia.org [online], "Hash function" created on Sep. 2001, retrieved on Oct. 17, 2023, retrieved from URL <https://en.wikipedia.org/wiki/Hash_function>, 15 pages.
Wikipedia.org [online], "Information privacy" created on May 2003, retrieved on Dec. 6, 2021, retrieved from URL <https://en.wikipedia.org/wiki/Information_privacy>, 7 pages.
Wikipedia.org [online], "Master Data" created on Oct. 2006, retrieved on Dec. 6, 2021, retrieved from URL <https://en.wikipedia.org/wiki/Master_data>, 2 pages.
Wikipedia.org [online], "Personal Data" created on May 2005, retrieved on Dec. 6, 2021, retrieved from URL <https://en.wikipedia.org/wiki/Personal_data>, 7 pages.
Non-Final Office Action in U.S. Appl. No. 18/487,365, mailed on Apr. 1, 2025, 15 pages.

* cited by examiner

AUTOMATING HANDLING OF DATA SUBJECT REQUESTS FOR DATA PRIVACY INTEGRATION PROTOCOLS

TECHNICAL FIELD

The present disclosure relates to computer-implemented methods, software, and systems for automating handling of data subject requests for data privacy integration protocols.

BACKGROUND

Applications used for organizations can use master data (such as name and address) and transactional data (such as orders and bills). Transactional data typically references corresponding master data. For instance, a transactional object of type Order can refer to a master data object of type Customer. A given master data object can be referenced by one or more (or perhaps no) transactional objects. In some cases, data may be considered master data in one context and transactional data in another context. For example, insurance contract data may be considered transactional data with respect to a customer object but considered master data with respect to transactional insurance claim data. When an organizational landscape includes multiple systems, a master data replication process can be performed so that master data objects are consistent across systems.

SUMMARY

The present disclosure involves systems, software, and computer implemented methods for automating handling of data subject requests for data privacy integration protocols. An example method includes: receiving, at a data privacy integration service, a ticket for performing a data privacy integration protocol for a data subject in a multi-application landscape, wherein the ticket includes a ticket parameter that affects processing of the ticket with respect to purpose information; providing, by the data privacy integration service and in response to receiving the ticket, a work package to responder applications in the multi-application landscape that are requested to respond to the work package, wherein the work package includes a work package parameter that is based on the ticket parameter; processing, by each responder application, the work package, wherein processing the work package by a respective responder application comprises: determining, by the responder application, for at least one object associated with the data subject, at least one purpose associated with the object; determining, by the responder application, for each determined purpose, a purpose setting that corresponds to the work package parameter; processing, by the responder application, the work package for the data privacy integration protocol based on the work package parameter and purpose settings of the at least one purpose; providing, by each responder application, feedback for the work package to the data privacy integration service; and processing, by the data privacy integration service, feedback from the responder applications, to continue the data privacy integration protocol for the ticket.

Implementations can include one or more of the following features. The ticket parameter can be included in the ticket by a requesting application that creates and provides the ticket to the data privacy integration service, by an administrator of the data privacy integration service, or by an automated rule evaluator. The data privacy integration protocol can be an integrated end-of-purpose protocol and the ticket parameter can specify whether the ticket corresponds to a right to be forgotten request for the data subject that requests removal of personal data for the data subject in the multi-application landscape. The work package can be a check work package for the integrated end-of-purpose protocol that requests the responder applications to provide votes on whether personal data for the data subject can be blocked and wherein the work package parameter indicates that the check work package corresponds to the right to be forgotten request. The work package parameter can instruct responder applications to, before providing votes, remove purposes, from personal data objects, for which: 1) the data subject has provided consent; or 2) the data subject can opt out. The work package parameter can instruct responder applications to vote as if purposes have been removed, without actual removal of purposes, from personal data objects, for which 1) the data subject has provided consent; or 2) the data subject can opt out. The work package can be a right to be forgotten work package, specific for the right to be forgotten request, that is sent to responder applications before a check work package is sent to the responder applications. The work package parameter can instruct the responder applications to remove purposes, from personal data objects, for which: 1) the data subject has provided consent; or 2) the data subject can opt out. The data privacy integration protocol can be an integrated personal data retrieval protocol and the ticket parameter specifies whether the ticket corresponds to a right of data access or a right of data portability for personal data for the data subject in the multi-application landscape. The work package parameter can specify whether the work package corresponds to the right of data access or the right of data portability for the data subject. The purpose setting can be used to determine whether an object associated with the purpose should be included in a personal data export for the integrated personal data retrieval protocol. The purpose setting can indicate whether the object qualifies for data portability or if exporting the object would adversely affect individuals other than the data subject. The purpose setting can represent a processing ground that can specify, independent of particular legislation, a ground for processing data according to a defined purpose. The processing ground can specify whether a purpose applies if the data subject has opted in to processing for the purpose, the purpose applies unless the data subject has opted out of processing for the purpose, the purpose applies unless the data subject has opted out of processing for the purpose and an assessment of an opt out request is approved, processing for the purpose is required by a data controller, or processing for the purpose is allowed for the data controller. The data privacy integration protocol can be an integrated end-of-purpose protocol, the work package can be a right to be forgotten work package, and processing, by responder applications, the work package for the data privacy integration protocol based on the work package parameter and purpose settings of the at least one purpose can include the responder applications removing, from objects, purposes that have a purpose setting indicating that the purpose applies if the data subject has opted in to processing for the purpose or that the purpose applies unless the data subject has opted out of processing for the purpose. The data privacy integration protocol can be an integrated end-of-purpose protocol, the work package can be a check work package, and processing, by responder applications, the work package for the data privacy integration protocol based on the work package parameter and purpose settings of the at least one purpose can include responder applications, before determining a local end-of-purpose vote for an object, removing, from the object, purposes that have a purpose setting indicating that the purpose applies if the data subject has opted in to processing for the purpose or that the purpose applies unless the data subject has opted out of processing for the purpose. The data privacy integration protocol can be an integrated end-of-purpose protocol, the work package can be a check work package, and processing, by responder applications, the work package for the data privacy integration protocol based on the work package parameter and purpose settings of the at least one purpose can include responder applications, when determining a local end-of-purpose vote for an object, considering, without removing purposes, that purposes have been removed from the object that have a purpose setting indicating that the purpose applies if the data subject has opted in to processing for the purpose or that the purpose applies unless the data subject has opted out of processing for the purpose. The data privacy integration protocol can be an integrated personal data retrieval protocol and processing, by responder applications, the work package for the data privacy integration protocol based on the work package parameter and purpose settings of the at least one purpose can include responder applications identifying a data object for personal data export if 1) the work package parameter indicates the ticket is for a personal data access request and no purpose setting of a purpose for the object indicates that exporting the data object would adversely affect individuals other than the data subject; or 2) the work package parameter indicates the ticket is for a portability request and a purpose setting of a purpose for the object indicates that the object is qualified for portability.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
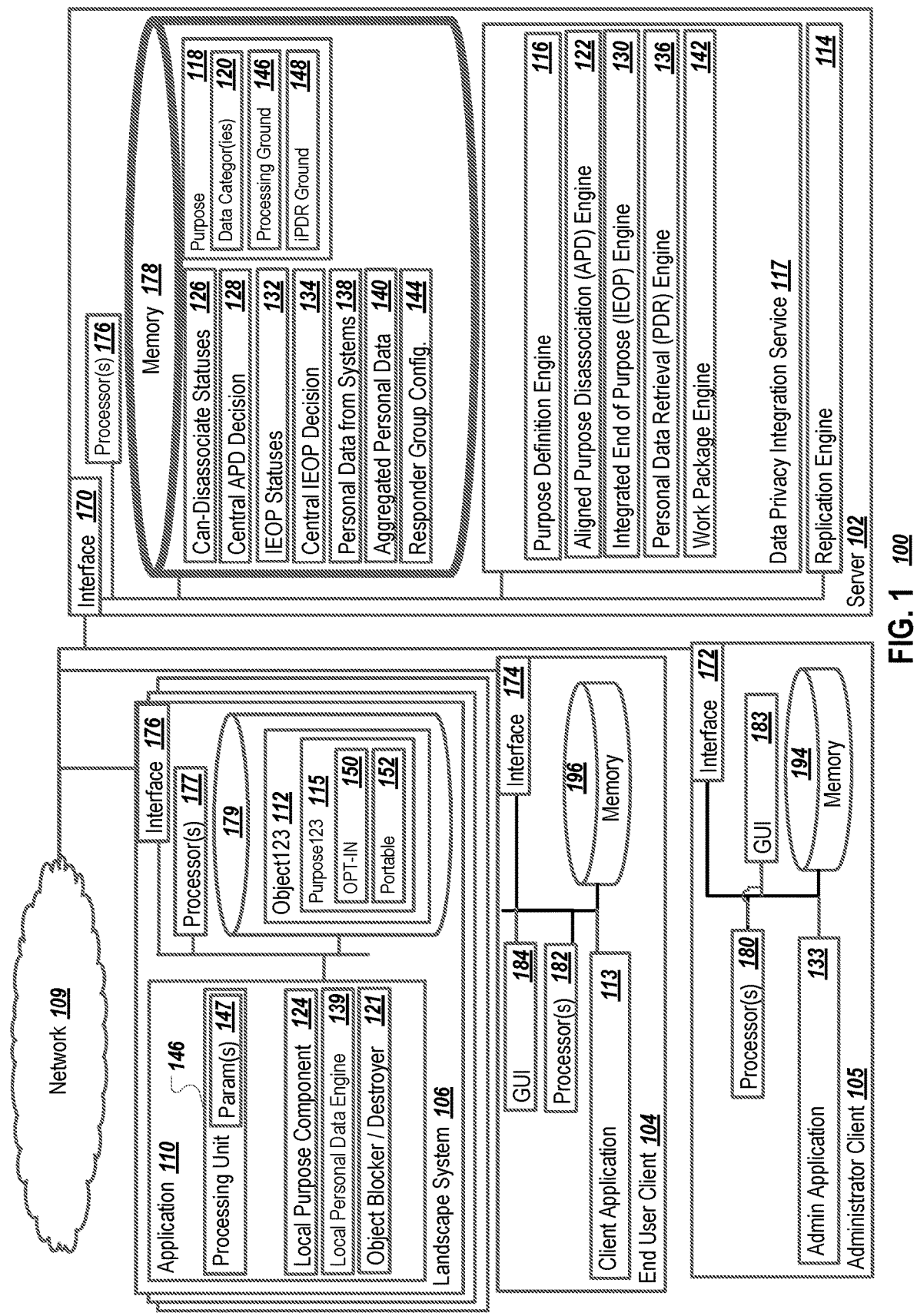
FIG. 1 is a block diagram illustrating an example system for integrated data privacy services.

An integrated multiple-application landscape can include a data privacy integration (DPI) service that provides various functions for integrating personal data related capabilities of different applications. For example, the DPI service can include protocols related to integrated end-of-purpose processing, integrated personal data retrieval, aligned purpose disassociation, and other protocols. An integrated end-of-purpose protocol can be used to aligned different applications on a point in time when personal data should be blocked from further processing. An integrated personal data retrieval protocol can be used to manage receiving exports of personal data from various applications, so that a common report including personal data concerning a same data subject (e.g., natural person, individual) from multiple applications can be generated. An aligned purpose disassociation protocol can be used to align various applications on when a purpose assignment is removed from a data object. The various DPI protocols can be used on-premise and/or in cloud environments, and can be designed as asynchronous protocols using asynchronous communication between the DPI service and the various applications.

The integrated end-of-purpose, integrated personal data retrieval, and aligned purpose disassociation protocols are described in more detail in U.S. patent application Ser. No. 17/457,797, filed on Dec. 6, 2021 entitled "INTEGRATED END-OF-PURPOSE PROTOCOL FOR MULTIPLE APPLICATIONS", U.S. patent application Ser. No. 17/457,811, filed on Dec. 6, 2021 entitled "INTEGRATED PERSONAL DATA RETRIEVAL ACROSS MULTIPLE APPLICATIONS", and U.S. patent application Ser. No. 17/457,802, filed on Dec. 6, 2021 entitled "ALIGNED PURPOSE DISASSOCIATION PROTOCOL FOR MULTIPLE APPLICATIONS", respectively, the entire contents of each which are hereby incorporated by reference.

Applications may expend a non-trivial amount of resources responding to requests from the DPI service. Different approaches can be used to reduce resource consumption. For example, applications can be grouped into what can be referred to as responder groups, where the DPI service asks applications in different responder groups, in turn, to respond to a request. Applications can be grouped according to a resource-reduction strategy. For example, applications that are more likely to provide a veto vote (e.g., cannot-block, cannot-disassociate purpose) can be put into earlier responder groups, to reduce a likelihood of other applications unnecessarily performing integrated end-of-purpose or aligned purpose disassociation processing, respectively. Other examples include putting applications that are more likely to fail a block operation in earlier responder groups, or putting applications that are likely to expend more resources responding to a request in a later responder group. Responder groups are described in more detail in U.S. patent application Ser. No. 17/718,770, filed on Apr. 12, 2022 entitled "DATA PRIVACY INTEGRATION SERVICES PROCESSING USING MULTIPLE WORK PACKAGES AND MULTIPLE RESPONDER GROUPS", the entire contents of which are hereby incorporated by reference.

A software system in which a data controller (e.g., a customer of the software system) models purposes for which personal data is processed can link custom-defined purposes with processing actions that are performed for these purposes, so that the processing of personal data within the software system is purpose-based. Additionally, data categories can be associated with purposes to define what personal data of which data categories can be used for different processing steps. Purpose-based processing is described in more detail in U.S. patent Ser. No. 18/347,029, filed Jul. 5, 2023, entitled "PURPOSE-BASED PROCESSING BY PURPOSE-ACTION ASSOCIATION," the entire contents of which are hereby incorporated by reference.

Data protection legislation in various jurisdictions can define that personal data should be processed for specified purposes and only when the processing is based on a legal basis. A legal basis (e.g., legal ground) can be of the following, for example: 1) consent: a basis for a purpose based on a freely given, specific, informed and unambiguous indication of the data subject's wishes by which the data subject, by a statement or by a clear affirmative action, signifies agreement to the processing of the personal data relating to the data subject by a data controller; 2) contract: for fulfilling a contract between the data subject and the data controller; 3) interest-balance: for balancing necessary legitimate interests of the data controller with interests of the data subject (including, in some cases, also balancing interests of one or more third parties, such as governmental (e.g., public) interest); 4) obligation: processing based on an external legal obligation (e.g., tax legislation); 4) vital: processing to provide vital actions to the data subject or any other natural person (e.g., hospital emergency room); or 5) public: processing in the public interest (e.g., government forces). Example data protection legislation is the GDPR (General Data Protection Regulation) of the European Union.

A legal ground can help to document legal reasons for processing but a legal ground may not be sufficient or desirable for a software system (e.g., enterprise software system that processes personal data) to model for deriving software processing activities on data. For example, legislation can change over time, but amendments or changes to legislation, or new legislation, may not affect actual activities that a software system may or may not be allowed to perform. As another example, a data controller might extend or move operations to another jurisdiction that has different types of legislation in effect.

Accordingly, modeling a legal basis into a software system may not be desired as an acceptable design choice, since although a change of data protection legislation applicable to a data controller may affect legal bases of processing, certain processing operations that were legitimate before a change in legislation may remain legitimate after amendments to legislation. Accordingly, information technology system administrators may not be interested in being concerned with tracking exact details of legal developments but may prefer instead to focus on providing a well-running, high-quality software system to support the data controller's operations. As such, a legal basis (e.g., from Article 6(1) and Article 9(2) of the GDPR, or Member State law, or Union law, or respective legal bases in other jurisdictions) can be excluded from a data model of a software system. An underlying legal reason can be considered to be related, with respect to software modeling, to a separation of concerns between system administrators and data protection experts, for example. For instance, a software system can be designed such that a legal change without effect on what is permitted to do in the software system does not require a software administrator to maintain information about the legal change in the software system.

However, the software system can be designed such that any effects on processing of data, of an underlying legal basis, are reflected in the software system, such as for use during execution of data privacy integration protocols. For instance, rather than modeling a legal ground, a processing ground can be used instead. A processing ground, rather than a legal ground, can be an attribute of a purpose entity, for example. As mentioned, purposes can be a leading entity in a software system for data processing in that purposes can guide and limit the processing of personal data and provide a context to the use of the personal data. A processing ground, as used in a purpose model, in contrast to use of a legal ground, can relate to activities or actions that a software system can perform. As such, the processing ground can be an abstraction, independent of particular legislation, that provides a ground for processing data according to a defined purpose. A processing ground can be specific for modeling information about the effect of different legal bases on purpose-based processing with respect to necessary actions, without modeling the legal ground itself.

Example processing grounds can indicate, for example, whether a data subject has opted out, whether the data subject had an opt out request approved after an assessment, or whether the data subject opted in to processing performed for certain purposes. As another example, other processing grounds can indicate that processing for certain purposes is required for some reason or allowed by law for some reason. Processing grounds and their handling are described in more detail below.

As an example, consider a professional association with members. A first member may wish to contact other members by obtaining email addresses of the other members for purposes of sending a message to members regarding association activity, such as the first member desiring to gain support for replacing the board of the association. A court may have ruled that replying to a request by an association member to obtain contact information for other members of an association is considered relative to performance of a contract by the association. However, some members may object to their email address being shared, claiming a data protection right of denying providing of their email address to another member. The association may decide that members can have a right to opt out of processing that shares their email address with other members. Accordingly, the preventing of the sharing of an email address can be handled with a processing ground of opt-out. The sharing of email address information for members who have not opted in, from a legal perspective, can occur under a particular legal ground (e.g., performance of a contract). However, the software system need only consider whether a particular user has opted out of certain processing, without needing to be aware of legal reasons processing may otherwise occur or where a user ability to opt-out arises from. In this example, an opt-out ability may arise from civil law, whereas in other cases an opt-out ability may arise from data protection regulations As described in more detail below, data privacy integration protocols, such as iEoP, APD and iPDR, can be enhanced in such a way, so that data subject requests can be handled automatically, end-to-end, with less manual effort involved. For instance, relevant information for the handling of data subject requests can be maintained centrally and distributed to different applications, using existing mechanisms. Data privacy integration protocols, such as iEoP, APD and iPDR, can be enhanced to use processing ground information to simplify system/application handling of data subject requests and to increase a level of automatic processing of data privacy processing. Additionally, a likelihood of error can be reduced, since relevant information about which data should be included in a personal data export, or which data can be deleted under which circumstances, can be considered at the source of a decision (e.g., locally in an application or system that is responding to a DPI request) as compared to less relevant points that may be at an earlier or a later point in time in a context away from local processing. Additionally, purpose modeling with processing ground configurations can be updated and used, such as in response to events from another system, such as a system that manages receiving and storing user consent information.

FIG. 1 is a block diagram illustrating an example system 100 for integrated data privacy services. Specifically, the illustrated system 100 includes or is communicably coupled with a server 102, an end-user client device 104, an administrator client device 105, landscape systems 106, and a network 108. Although shown separately, in some implementations, functionality of two or more systems or servers may be provided by a single system or server. In some implementations, the functionality of one illustrated system, server, or component may be provided by multiple systems, servers, or components, respectively. For example, the server 102 includes different engines which may or may not be provided by a single system or server. Furthermore, although the system 100 is illustrated as being configured for handling operations for one organization, the server 102 and included components are configured to handle operations for multiple organizations (e.g., in a multi-tenant fashion). For instance, each organization may be a customer of a software provider that provides the server 102 (and other servers) and implementations of component included in the server 102. The software provider can also provide at least some of the landscape systems 106, which can each also have multi-tenant architectures.

The landscape systems 106 can include multiple systems that exist in a multi-system landscape. An organization can use different systems, of different types, to run the organization, for example. Other types of systems can be used to provide services for end users. The landscape systems 106 can include systems from a same vendor (e.g., the software provider mentioned above) or different vendors. The landscape systems 106 can each include at least one application 110 for performing organizational processes and working with organizational data. Organizational data can include master data objects and transactional objects. For example, the application 110 can process a master data object 112. An end user of the organization can use a client application 113 (which may be a client version of the application 110) on the end-user client device 104 to consume and/or interact with landscape data, including information from the master data object 112. Regarding the handling of master data objects, various best practices can be applied by an organization. For example, the system 100 can be configured so that corresponding master data objects are consistent across all landscape systems 106. For instance, a replication engine 114 can distribute master data to at least some of the landscape systems 106 so that each application 110 that acts on certain master data can perform processing on the same consistent master data. As described in more detail below, an administrator of the organization can use the administrator client device 105 to perform various administration and/or configuration tasks to configure the landscape systems 106 and/or other tools included in the server 102 (or other servers or systems).

For example, various data protection rules and laws may require that data is only processed for specified purposes. The system 100 can implement a purpose requirement by associating purpose information with each object instance (or portion of an object instance). For example, a purpose 115 has been associated with the master data object 112. A purpose definition engine 116 can be included in a DPI service 117 to enable customers to define purposes for processing personal data that are relevant for the customer. Defined purposes can be stored as purposes 118.

A purpose 118 can be associated with data categories 120. An administrator can assign one or more data categories 120 to a purpose 118 to specify which of potentially different attribute sets stored for a data object can be used when data for the purpose 118 is processed.

The landscape system 106 can receive the master data object 112 and the associated purpose 115 from the replication engine 114, for example. The DPI service 117 can determine which applications process objects for which purposes. The replication engine 114 can replicate an object with an assigned purpose to a given landscape system 106 when the landscape system 106 processes objects for that purpose.

Objects that no longer have any associated productive purposes can be put into a blocked state for a period of time, in accordance with one or more non-productive purposes, for instance by an object blocker/destroyer 121, before being deleted. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object. As another example, for an application that provides both productive functionality and audit functionality, the audit portion of the application can access blocked data but the productive portion of the application cannot access blocked data.

As part of an aligned disassociation approach, the landscape systems 106 can disassociate a purpose with an object in response to information received from an aligned purpose disassociation engine 122 of the DPI service 117, rather than solely based on a local decision. For example, each landscape system 106 can provide information to the aligned purpose disassociation engine 122. For example, a local purpose component 124 in each landscape system 106 can determine, for each purpose of an object, whether the purpose can be locally disassociated from the object. In some cases, the local purpose component 124 can determine, without consulting other systems, whether a purpose can be locally disassociated from the object. In other cases, the local purpose component 124 may consult other system(s) when performing the local check. For example, if a first system is integrated with a second system and exchanges data with the second system, but the second system is not integrated with the APD protocol, the first system may contact the second system and consider the status of the second system as part of a local status of the first system for the APD protocol. As another example, the second system may be integrated with the APD protocol but the first system may know that specific circumstances within the second system are relevant for the local status of the first system. For example, the first system may know that a purpose that cannot be disassociated from data within the second system may result in the purpose not being able to be disassociated in the first system. As an example, suppose the first system collects expense information that is transferred to the second system and posted as financial data in the second system. The first system may be integrated with the second system (e.g., before the systems became integrated with the APD protocol) in such a way that the first system can ask the second system whether a purpose can be disassociated from the data.

For example, each landscape system 106 can determine a "can-disassociate" status for a requested purpose and object. A can-disassociate status for a respective landscape system 106 can be either an affirmative can-disassociate status that indicates that the landscape system 106 can disassociate a purpose from an object or a negative can-disassociate status that indicates that the landscape system 106 cannot disassociate the purpose from the object. The aligned purpose disassociation engine 122 can collect received can-disassociate statuses 126. The aligned purpose disassociation engine 122 can evaluate the can-disassociate statuses 126 to determine a central aligned disassociate purpose decision 128 regarding disassociating a purpose from an object. The aligned purpose disassociation engine 122 can determine that the central aligned disassociate purpose decision 128 is to disassociate the purpose from the object if no landscape system 106 is unable to disassociate the purpose from the object. The aligned purpose disassociation engine 122 can determine that the central aligned disassociate purpose decision 128 is to not disassociate the purpose from the object if at least one landscape system 106 is unable to disassociate the purpose from the object. The aligned purpose disassociation engine 122 can provide the central aligned disassociate purpose decision 128 to each landscape system 106. The local purpose component 124 can disassociate the purpose from the object in response to receiving the central aligned disassociate purpose decision 128, if the central aligned disassociate purpose decision 128 is in fact to disassociate the purpose from the object.

The object blocker/destroyer 121 can block an object (e.g., from all production processing) when no productive purposes are associated with the object (e.g., after all productive purposes have been disassociated), according to one or more retention policies. An object can be blocked, rather than destroyed, if one or more retention policies associated with one or more non-productive purposes state that the object is to be maintained for access, outside of productive processing, only by authorized users. The object blocker/destroyer 121 can determine to destroy a blocked object in response to determining that all applicable retention reasons have expired. Object destruction decisions and actions can occur locally and independently in each landscape system 106. For example, each application 110 can determine locally whether a blocked object is to be destroyed. For instance, the application 110 can determine to destroy an object (e.g., a master data object) when no purposes are associated with the object, no transactional data references the object, and no retention policy currently applies to the object. In response to an object destruction decision, the object blocker/destroyer 121 can destroy the object. As described below, object blocking can be aligned across systems, so that, e.g. master data is blocked in all systems at substantially a same point in time to ensure that a first system does not create new transactional data referencing the master data where the new transactional data is replicated to a second system in which the master data had already been blocked.

In some implementations, an iEoP (Integrated End-of-Purpose) engine 130 of the DPI service 117 is used instead of or in addition to the APD engine 122. The iEoP engine 130 can send EoP queries to each landscape system 106 and receive EoP statuses 132 from the local purpose components 124 of different landscape systems regarding ability to block or delete a particular master data object. The iEoP engine 130 can evaluate the EoP statuses 132 to generate a central EOP decision 134. If a consensus is reached regarding ability to block an object, the iEoP engine 130 can distribute aligned block commands to trigger an aligned blocking of the object across the landscape systems 106. The iEoP engine 130 can also orchestrate integrated unblocking, when unblocking is required due to blocking failure in one or more systems, or for other reasons.

As mentioned, a data subject can have a right to request personal data stored associated with the data subject. The data subject (or the data controller, on behalf of the data subject) can initiate a personal data request from any of the landscape systems 106. For example, the data subject may submit a request using a user interface of the client application 113, with the request being received by the application 110 that handles requests from the client application 113. The application 110 can forward the request to a personal data retrieval engine 136 of the DPI service 117. Accordingly, any application within the landscape that is integrated with the DPI service 117 can request a report that, when generated, includes personal data automatically obtained by the DPI service from all of the other applications in the landscape. The data subject, therefore, can trigger a personal data request, in any one of the applications, rather than having to request from all of the applications. The PDR engine 136 automatically requests and receives personal data 138 from respective local personal data engines 139 in different landscape systems 106. The PDR engine 136 then creates aggregated personal data 140 and provides the aggregated personal data 140 to the data subject in response to the request, as a unified and uniform data report. In addition to the APD engine 122, the iEoP engine 130, and the PDR engine 136, the DPI service 117 can include or provide other data privacy integration services.

A work package engine 142 can be used to split requests into multiple work packages. As mentioned above, the DPI service 117 can send requests (e.g., work packages) to applications according to responder group configurations 144.

As mentioned above, data privacy integration protocols that are supported by the data privacy integration service 117, such as the iEoP protocol, the APD protocol, and the iPDR protocol can be enhanced with information about the effect of different progressing grounds on the processing and the necessary actions as response to data subject right requests. For instance, the purposes 118 can be modeled to include a processing ground value 146. In some implementations, the purposes 118 can also be modeled to include an iPDR ground value 148, as described in more detail below.

The processing ground value 146 and the iPDR ground value 148, therefore, can be stored per purpose. For instance, the purpose 115 for the object 112 can include a processing ground value 150 of opt-in, indicating that the purpose 115 applies if the data subject has opted-in. The processing ground value 150 can be considered in various DPI protocol processing. For instance, if the data subject submits a right-to-be-forgotten request, the request can be considered as an implied removal of consent. Accordingly, the purpose 115 can be disassociated from the object 112, and if no other purposes are associated with the object 112, the object 112 can be blocked (e.g., as part of processing of the right-to-be-forgotten request). As another example, the purpose 115 can include an iPDR ground value 152 of portable (e.g., representing "qualified for portability", as described below). As such, in response to a data subject request for personal data export (e.g., under a right to data portability as described, for example, in Article 20 of the GDPR), information from the object 112 can be included in the export.

Additionally, since the processing ground value 146 and the iPDR ground value 148 are stored per purpose in association with master data objects that represent data subjects, the processing ground and iPDR ground configurations can be automatically replicated to landscape systems 106, for example, using the replication engine 114. Accordingly, as a result of replication by the replication engine 114, processing ground information that may initially be centrally configured (e.g., by an administrator using the administrator client device 105) can be automatically present in all responders of a data privacy integration protocol. Responders can therefore consider, in a decentralized fashion, whether certain data is to be erased under a certain circumstance, whether information is to be included in a data subject request, etc. Further examples of using processing ground and iPDR ground are discussed below.

As used in the present disclosure, the term "computer" is intended to encompass any suitable processing device. For example, although FIG. 1 illustrates a single server 102, a single end-user client device 104, a single administrator client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system or runtime environment, including Linux, UNIX, Windows, Mac OS®, Java™, Android™, iOS, BSD (Berkeley Software Distribution) or any other suitable operating system. According to one implementation, the server 102 may also include or be communicably coupled with an e-mail server, a Web server, a caching server, a streaming data server, and/or other suitable server.

Interfaces 170, 172, 173, and 174 are used by the server 102, the end-user client device 104, the landscape system 106, and the administrator client device 105, respectively, for communicating with other systems in a distributed environment—including within the system 100—connected to the network 108. Generally, the interfaces 170, 172, 173, and 174 each comprise logic encoded in software and/or hardware in a suitable combination and operable to communicate with the network 108. More specifically, the interfaces 170, 172, 173, and 174 may each comprise software supporting one or more communication protocols associated with communications such that the network 108 or interface's hardware is operable to communicate physical signals within and outside of the illustrated system 100.

The server 102 includes one or more processors 176. Each processor 176 may be a central processing unit (CPU), a blade, an application specific integrated circuit (ASIC), a field-programmable gate array (FPGA), or another suitable component. Generally, each processor 176 executes instructions and manipulates data to perform the operations of the server 102. Specifically, each processor 176 executes the functionality required to receive and respond to requests from the end-user client device 104, for example. Similarly, each landscape system 106 includes one or more processors 177. Each processor 177. Each processor 177 executes instructions and manipulates data to perform the operations of the respective landscape system 106.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP OO (Object Oriented), any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 178. In some implementations, the server 102 includes multiple memories. The memory 178 may include any type of memory or database module and may take the form of volatile and/or non-volatile memory including, without limitation, magnetic media, optical media, random access memory (RAM), read-only memory (ROM), removable media, or any other suitable local or remote memory component. The memory 178 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102. Similarly, each landscape system 106 includes memory 179. The memory 179 may store various objects or data associated with the purposes of the landscape system 106.

The end-user client device 104 and the administrator client device 105 may each be any computing device operable to connect to or communicate in the network(s) 108 using a wireline or wireless connection. In general, each of the end-user client device 104 and the administrator client device 105 comprises an electronic computer device operable to receive, transmit, process, and store any appropriate data associated with the system 100 of FIG. 1. Each of the end-user client device 104 and the administrator client device 105 can include one or more client applications, including the client application 113 or an administrative application 133, respectively. A client application is any type of application that allows a client device to request and view content on the client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator client device 105 respectively include processor(s) 180 or processor(s) 182. Each processor 180 or 182 included in the end-user client device 104 or the administrator client device 105 may be a central processing unit (CPU), an application specific integrated circuit (ASIC), a field-programmable gate array (FPGA), or another suitable component. Generally, each processor 180 or 182 included in the end-user client device 104 or the administrator client device 105 executes instructions and manipulates data to perform the operations of the end-user client device 104 or the administrator client device 105, respectively. Specifically, each processor 180 or 182 included in the end-user client device 104 or the administrator client device 105 executes the functionality required to send requests to the server 102 and to receive and process responses from the server 102.

Each of the end-user client device 104 and the administrator client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the server 102, or the client device itself, including digital data, visual information, or a GUI 183 or a GUI 184, respectively.

The GUI 183 and the GUI 184 each interface with at least a portion of the system 100 for any suitable purpose, including generating a visual representation of the client application 113 or the administrative application 133, respectively. In particular, the GUI 183 and the GUI 184 may each be used to view and navigate various Web pages. Generally, the GUI 183 and the GUI 184 each provide the user with an efficient and user-friendly presentation of business data provided by or communicated within the system. The GUI 183 and the GUI 184 may each comprise a plurality of customizable frames or views having interactive fields, pull-down lists, and buttons operated by the user. The GUI 183 and the GUI 184 each contemplate any suitable graphical user interface, such as a combination of a generic web browser, intelligent engine, and command line interface (CLI) that processes information and efficiently presents the results to the user visually.

Memory 194 and memory 196 respectively included in the end-user client device 104 or the administrator client device 105 may each include any memory or database module and may take the form of volatile or non-volatile memory including, without limitation, magnetic media, optical media, random access memory (RAM), read-only memory (ROM), removable media, or any other suitable local or remote memory component. The memory 194 and the memory 196 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 104 and administrative client devices 105 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Figure 2:
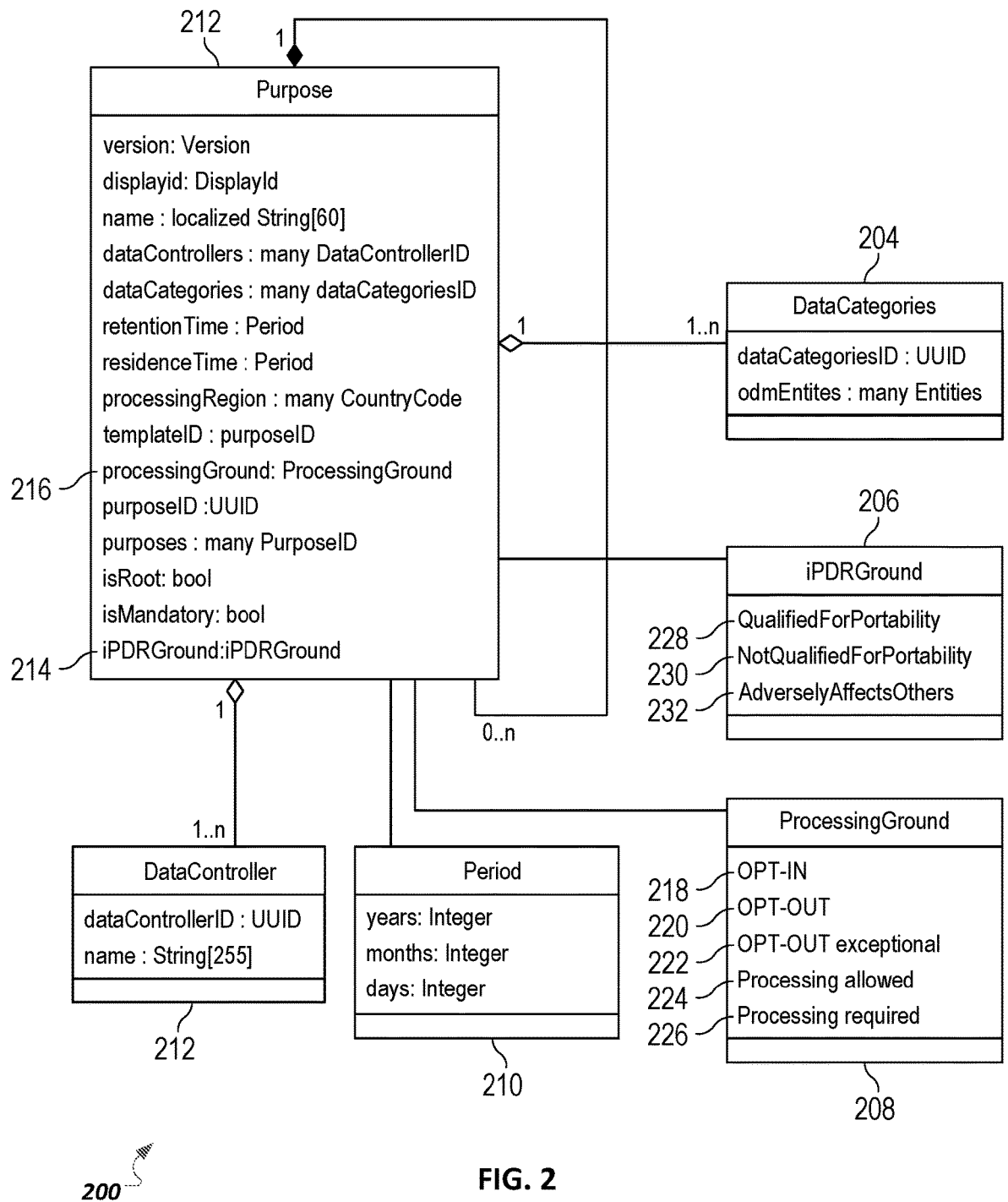
FIG. 2 illustrates an example purpose data model.

FIG. 2 illustrates an example purpose model 200. The purpose model includes a purpose entity 202, a data categories entity 204, an iPDRGround enumeration 206, a processing ground enumeration 208, a period entity 210, and a data controller entity 212. The purpose entity 202 represents a purpose defined by a data controller (e.g., an instance of the purpose entity 202 can be linked to an instance of the data controller entity 212). An instance of the purpose entity 202 can represent a reason of personal data processing of data by a data controller. The period entity 210 can represent a retention period for a purpose. Data categories (e.g., instances of the data category entity 204) can be associated with purposes to define what personal data of which data categories can be used for different processing steps.

An instance of the purpose entity 202 can include a value 214 selected from the iPDRGround enumeration 206 and a value 216 from the processing ground enumeration 208. The processing ground enumeration 208 includes values that represent the effects that a legal basis (e.g., in data protection law, in most cases, or from civil law in some cases, as described above) might have, that applies to the processing of personal data for the respective purpose. Possible values of the processing ground enumeration 208 include opt-in 218, opt-out 220, opt-out exceptional 222, processing allowed 224, and processing required 226.

The opt-in value 218 for the processing ground enumeration 208 for a purpose represents that processing for the purpose can only take place after the data subject has opted in (e.g., given consent). Accordingly, if a system receives a right-to-be-forgotten request for a data subject, data that has a purpose with a processing ground of opt-in can be considered as able to be deleted by the system (assuming no other reasons exist, such as legal holds), because the right-to-be-forgotten request can be considered as a withdrawal of the previously-provided consent.

The opt-out value 220 for the processing ground enumeration 208 for a purpose represents that processing for the purpose can occur until the data subject opts out. The data controller should then stop processing data for the purpose in response to receiving the opt out request. For instance, a data controller may have a legitimate interest to do marketing activities, but the data subject may choose to opt out and the data controller should then no longer perform marketing related processing for the data subject after receiving and processing the opt out request.

The opt-out exceptional value 222 for the processing ground enumeration 208 for a purpose represents that processing for the purpose can occur but the data subject can opt out of the processing for the purpose, but that an assessment of the opt out request can occur to balance interest of the data subject and the data controller. The opt-out exceptional value 218 may be stored for the purpose for the data subject if a result of the assessment is that the interest of the data subject outweighs the interest of the data controller. As an example, a data controller that is an organization with employees may maintain an address book of employees so that colleagues can obtain certain contact information about other employees. In an example scenario, a given employee may object to having their contact information in the address book due to concerns of other employees using the contact information to harass the employee (e.g., due to interpersonal conflict, bullying, etc.). The data subject may contend that their rights or interest outweigh the interest of the organization in having an address book. A data protection officer of the organization can receive and review the opt-out request and can determine, for example, that the opt-out request can be approved. Accordingly, behavior of an address book application can proceed so that contact information for the employee is not available in the address book (while contact information for other employees who have not opted out remains available).

As another example, a professional association may also have an address or contact list that is made available to members of the professional association, and a data protection officer of the professional association may determine, in response to an opt out request from a particular professional who prefers to not be contacted, that the opt out request is denied based on a determination that having members be able to contact one another is a higher interest than the preference of the particular professional and being open to be contacted is considered a part of membership to which members agreed upon joining. Accordingly, for some opt-out requests, the data controller can conclude for most requests that the processing can continue. However, in special cases (e.g., for a data subject who experiences severe threats, is part of a witness protection program, or who has other severe interests in ending the processing for the purpose), the data controller may be legally obliged to end the processing. In general, if a data subject objects to processing for a purpose, and the request is not manifestly unfounded or excessive, the data controller has the obligation to review the data subject's arguments.

The processing allowed value 224 for the processing ground enumeration 208 for a purpose represents that processing for the purpose is allowed in normal cases, such as based on a contract. No opt-in is required and no opt-out is possible, by the data subject. The data controller can choose to stop the processing for the purpose, but the data subject has no direct remedy to force the data controller to stop the processing (e.g., at least while a contract is in force). For example, a customer may interact with an online retailer to submit an order. The online retailer may be allowed to store records of the transaction and maintain the records for a certain period of time (e.g., to support potential return of items). The customer may have no remedy to insist that the online retailer deletes the transaction records before a retention period expires, for example.

The data subject could eventually take an action that leads to the processing ending at a certain point. For example, if the processing is based on the performance of a contract to which the data subject is party, the data subject might terminate the contract. At some potentially later point in time, the data processing might then be finished (e.g., after expiration of applicable retention periods).

The processing required value 226 for the processing ground enumeration 208 for a purpose represents that processing is required by law and that neither the data controller nor the data subject have a possibility to stop the processing without infringing applicable laws. Accordingly, data processed for the purpose should not be deleted (e.g., until applicable retention periods expire), even if the data subject associated with the data submits a right-to-be-forgotten request, for example. That is, a system that processes a master data object whose processing is required should therefore not delete the object. In some cases, the object can be blocked, and certain processing that may be required (e.g., tax auditing) may be performed on the blocked object. The system should not physically destroy the object, however, while processing is required.

As an example, an online retailer that sells and delivers products to customers may be required to maintain certain data records about a customer's transactions for a certain period of time, for tax auditing purposes. Neither the customer nor the online retailer should be permitted to take action that would result in the customer's transaction data being deleted before the retention period defined by the pertinent tax regulation expires.

Although processing may currently be required by law, the data subject and/or the data controller might use legal remedies to cause a change of the law. For example, a legal obligation to store certain data might, according to the opinion of one or more parties, infringe a constitution, and the data subject, the data controller, or another party may involve a constitutional court which might eventually invalidate the legal obligation.

Possible values of the iPDRGround enumeration 206 include QualifiedForPortability 228, NotQualifiedForPortability 230, and Adversely AffectsOthers 232. The QualifiedForPortability value 228 for a purpose indicates that data that is processed for the purpose qualifies for being included in a response under a legal right to portability (e.g., as described in Article 20 of the GDPR). Accordingly, if a data subject requests data, for example under Article 20 of the GDPR (or, as another example, general access under Article 15 of the GDPR), the data processed for the purpose is to be exported in response to the request. As an example of data portability, suppose the data controller is a first music streaming service and stores record for a data subject regarding the data subject's listening history, favorite artists, etc. The data subject can have a right to obtain access to this stored data, such as for purposes of using the data when subscribing to a second music streaming service. The data returned in a data portability request can be in a machine-readable format. In some cases, an interface can be provided to directly export the data subject data from the first music streaming service to the second music streaming service.

The NotQualifiedForPortability value 230 for a purpose indicates that data that is processed for the purpose does not qualify for being included in a response under a legal right to portability (e.g., under Article 20) but may be exported under a general access request (e.g., Article 15). The AdverselyAffectsOthers value 232 for a purpose indicates that data that is processed for the purpose should not be returned under a general access request (e.g., Article 15), nor under a data portability request (e.g., Article 20) because the data might adversely affect the rights and freedoms of others. For example, an organization may have data stored (e.g., name, financial account information) to manage a court-mandated payroll deduction for a data subject as a mandated payment to another individual. The data subject would not have the right to obtain the information stored for the other individual.

Other values can be included in the iPDRGround enumeration 206. For instance, an enumeration value can be included the indicates that certain medical data should not be shared with the data subject. For instance, certain details of a psychiatric evaluation may not be suitable to be provided directly to the data subject (e.g., an assumption can be that a physician would verbally discuss a diagnosis with the patient but that a risk may occur to the patient (e.g., a suicidal patient) if complete evaluation notes were provided to the patient). Other enumeration values can be added, which may depend on a particular landscape. For instance, a value indicating to not share some medical data may be included in a landscape serving a hospital but not included in other types of landscapes.

Although the iPDRGround enumeration 206 and the processing ground enumeration 208 are shown as being defined on a purpose level (e.g., via the value 214 selected from the iPDRGround enumeration 206 and the value 216 from the processing ground enumeration 208 included in the purpose entity 202), in some implementations, the iPDRGround enumeration and/or the processing ground enumeration may be modeled for certain data categories that are processed for a certain purpose (e.g., the respective enumerations may be set for a combination of purpose and data category). Although shown as enumerations, the functionality of the iPDRGround enumeration 206 and the processing ground enumeration 208 can be implemented using other technical means, such as pre-filled arrays, etc.

Figure 3:
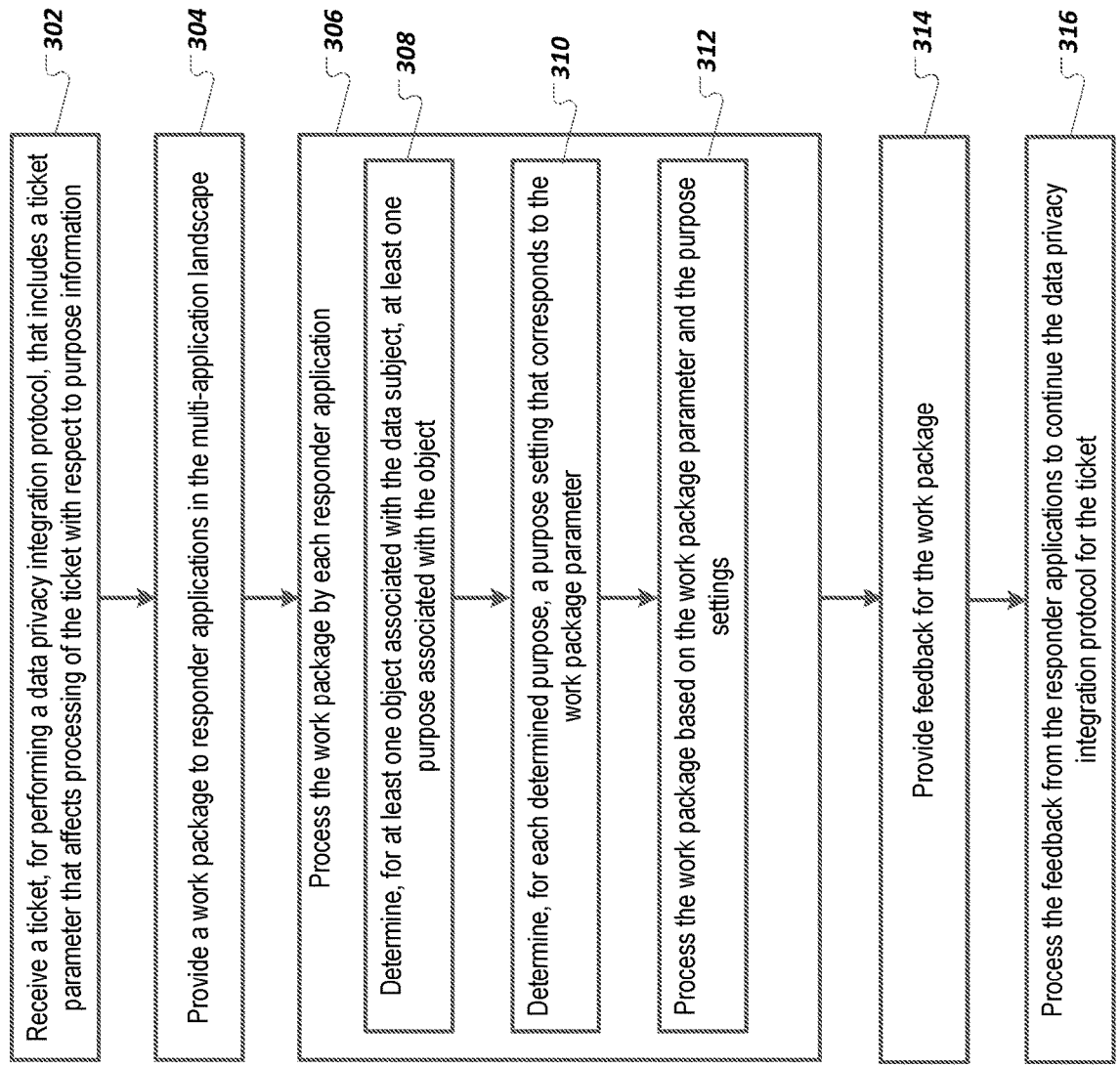
FIG. 3 is a flowchart of an example method.

FIG. 3 is a flowchart of an example method 300 for automating handling of data subject requests for data privacy integration protocols. It will be understood that method 300 and related methods may be performed, for example, by any suitable system, environment, software, and hardware, or a combination of systems, environments, software, and hardware, as appropriate. For example, one or more of a client, a server, or other computing device can be used to execute method 300 and related methods and obtain any data from the memory of a client, the server, or the other computing device. In some implementations, the method 300 and related methods are executed by one or more components of the system 100 described above with respect to FIG. 1. For example, the method 300 and related methods can be executed by the server 102 of FIG. 1.

At 302, a ticket is received, at a data privacy integration service, for performing a data privacy integration protocol for a data subject in a multi-application landscape. The ticket includes a ticket parameter that affects processing of the ticket with respect to purpose information. The data privacy integration protocol can be, for example, the integrated end-of-purpose protocol and the ticket parameter can specify whether the ticket corresponds to a right to be forgotten request for the data subject that requests removal of personal data for the data subject in the multi-application landscape. As another example, the data privacy integration protocol can be an integrated personal data retrieval protocol and the ticket parameter can specify whether the ticket corresponds to a right of data access or a right of data portability for personal data for the data subject in the multi-application landscape. Other parameters may be set for a ticket, such as a "no-optimization" flag and/or a "verbose" flag, as described in more detail in incorporated applications. For instance, the no-optimization flag can instruct the DPI service to include all responders in the ticket, even in the case of vetoes, and to not reject a ticket based on performance optimizations, such as a known maximum application minimum remaining processing time timestamp, or a potentially capped maximum application minimum remaining processing time timestamp. The verbose flag can instruct applications to provide detailed information regarding application votes.

The ticket parameter can be included in the ticket by a requesting application that creates and provides the ticket to the data privacy integration service. For example, an API provided by the DPI service to create a ticket may support inclusion of a URL (Uniform Resource Locator) parameter "rtbf" (right to be forgotten) that can be set to true. As another example, the ticket parameter can be included in the ticket by an administrator of the data privacy integration service. For example, after a requesting application has created and submitted a ticket, the administrator can modify the ticket and configure the ticket as a "right to be forgotten" request.

As yet another example, the ticket parameter can be included in the ticket by an automated rule evaluator engine. For example, the rule evaluator engine can be a component of the DPI service that evaluates configured rules with respect to treating tickets as right to be forgotten requests. For instance, an example rule may specify that tickets created by a specific application or service are automatically treated as right to be forgotten requests (while tickets from other applications are not automatically treated as right to be forgotten requests). For example, the specific application may be intentionally developed as a service for handling right to be forgotten requests, as a dedicated DPI requester.

At 304, the data privacy integration service provides, in response to receiving the ticket, a work package to responder applications in the multi-application landscape that are requested to respond to the work package. The work package includes a work package parameter that is based on the ticket parameter. In some cases, the work package parameter can be the same as the ticket parameter. For example, a right to be forgotten flag included in the ticket can be carried over to and included in the work package, such as in a header portion of the work package. As another example, in some cases the work package parameter is derived from, but differs from, the ticket parameter. For example, the DPI service can, for some responders, transform or enhance a right to be forgotten parameter to include additional information or indicators for the responder, such as an indicator of whether the ticket applies under GDPR or another regulation, such as CCPA (California Consumer Privacy Act), or some other indicator not expressly included in the ticket parameter. Or, alternatively, the ticket parameter may indicate GDPR OR CCPA but DPI may strip off that detail and include a more generic right to be forgotten indicator in a work package parameter as a more general request for responders. As another example, the DPI service can configure a different work package parameter for the requesting application (e.g., the requester of the ticket later acting as a responder for the ticket) as compared to a work package parameter configured for other responders.

When the work package is for the integrated personal data retrieval protocol, the work package parameter can specify whether the work package corresponds to the right of data access or the right of data portability for the data subject. As another example, the work package can be a check work package for the integrated end-of-purpose protocol that requests the responder applications to provide votes on whether personal data for the data subject can be blocked. In this example, the work package parameter can indicate that the check work package corresponds to the right to be forgotten request. The work package parameter for the check work package can instruct responder applications to, before providing votes, remove purposes, from personal data objects, for which: 1) the data subject had provided consent; or 2) the data subject can opt out. For example, a check work package provided to responders can include a flag that indicates that prior to a determination of a local end-of-purpose status, consents for the data subject are to be withdrawn by the responder and purposes that are configured as eligible for an opt out are to be considered as having been opted-out. For this type of work package, all responders might be in a first (and only) responder group for the check phase, because all responders can receive the right to be forgotten request.

As another example, the work package parameter for the check work package can instruct responder applications to vote as if purposes have been removed, without actual removal of purposes, from personal data objects, for which 1) the data subject had provided consent; or 2) the data subject can opt out. That is, the work package parameter can instruct responders to consider the work package as related to a right to be forgotten only for the determination of local data lifecycle statuses, without actually removing any purposes in the check phase. The removal of purposes may then happen later during the block phase, if the object is blocked in general, for example.

As yet another example for the integrated end-of-purpose protocol, the work package can be a right to be forgotten work package, specific for the right to be forgotten request, that is sent to responder applications before a check work package is sent to the responder applications, and the work package parameter can instruct the responder applications to remove any purposes, from personal data objects, for which: 1) the data subject had provided consent; or 2) the data subject can opt out. For example, the right to be forgotten work package can be sent by DPI as a first work package type for the ticket to all responders. A check work package can be later sent for the ticket, to at least some responder applications (e.g., per responder group processing).

At 306, each responder application processes the work package. Processing the work package by a respective responder application can involve different steps. At 308, the responder application can determine, for at least one object associated with the data subject, at least one purpose associated with the object.

At 310, the responder application can determine, for each determined purpose, a purpose setting that corresponds to the work package parameter. For example, when the protocol is the integrated personal data retrieval protocol, the purpose setting can be used to determine whether an object associated with the purpose should be included in a personal data export for the integrated personal data retrieval protocol. The purpose setting can, for example, indicate whether the object qualifies for data portability or if exporting the object would adversely affect individuals other than the data subject.

As another example, when the protocol is the integrated end-of-purpose protocol, the purpose setting can represent a processing ground that can specify, independent of particular legislation, a ground for processing data according to a defined purpose. For instance, and as described above with respect to FIG. 2, the processing ground can specify whether a purpose applies if the data subject has opted in to processing for the purpose, the purpose applies unless the data subject has opted out of processing for the purpose, the purpose applies unless the data subject has opted out of processing for the purpose and an assessment of an opt out request is approved, processing for the purpose is required by a data controller, or processing for the purpose is allowed for the data controller.

At 312, the responder application processes the work package for the data privacy integration protocol based on the work package parameter and purpose settings of the at least one purpose. For example, when the data privacy integration protocol is the integrated end-of-purpose protocol and the work package is a right to be forgotten work package, the responder application can remove, from objects, purposes that have a purpose setting indicating that the purpose applies if the data subject has opted in to processing for the purpose or that the purpose applies unless the data subject has opted out of processing for the purpose. In other words, responders can process all purposes associated with a master data object that represents the data subject and/or data objects associated with the master data object that represents the data subject and that are personal data concerning the data subject, by considering all given consents as withdrawn if the associated purpose has the processing ground of "opt in". As another example, responders can consider, for the purposes associated with the objects, as indicated as "processing rejected", for the purposes with a processing ground of "opt-out".

As another example, when the data privacy integration protocol is the integrated end-of-purpose protocol and the work package is a check work package, the responder application can, before determining a local end-of-purpose vote for an object, remove, from the object, purposes that have a purpose setting indicating that the purpose applies if the data subject has opted in to processing for the purpose or that the purpose applies unless the data subject has opted out of processing for the purpose. After removing purposes, the responder application can determine the local end-of-purpose for the object. For example, after purposes have been removed, if no other purposes are associated with an object, the responder can determine a can-block vote for the object, otherwise the responder can determine a cannot-block vote for the object.

As yet another example for a check work package for the integrated end-of-purpose protocol, the responder application, when determining a local end-of-purpose vote for an object, can consider, without actually removing purposes, that purposes have been removed from the object that have a purpose setting indicating that the purpose applies if the data subject has opted in to processing for the purpose or that the purpose applies unless the data subject has opted out of processing for the purpose. For example, after identifying purposes to be considered as removed for purposes of vote determination, if no other purposes are associated with an object, the responder can determine a can-block vote for the object, otherwise the responder can determine a cannot-block vote for the object.

As an example for the integrated personal data retrieval protocol, the responder application can identify a data object for personal data export if 1) the work package parameter indicates the ticket is for a personal data access request and no purpose setting of a purpose for the object indicates that exporting the data object would adversely affect individuals other than the data subject; or 2) the work package parameter indicates the ticket is for a portability request and a purpose setting of a purpose for the object indicates that the object is qualified for portability.

At 314, each responder application provides feedback for the work package to the data privacy integration service. For example, when the work package is the check work package, the feedback can include can-block or cannot-block votes for each object associated with the work package. As another example, when the work package is the right to be forgotten work package, the feedback can include a list of all purposes that no longer apply and a list of the other purposes that still apply, with associated processing grounds. As yet another example, when the protocol is the integrated personal data retrieval protocol, the feedback can include personal data collected by the application after considering purpose settings and the work package parameter.

At 316, the data privacy integration service processes the feedback from the responder applications, to continue the data privacy integration protocol for the ticket. For example, when the work package is the check work package, the DPI service can evaluate votes received from different responders, determine whether to send a block instruction, etc. As another example, when the work package is for the integrated personal data retrieval protocol, the DPI service can collect personal data received from different responders and create an aggregate report to be provided to the data subject.

When the work package is the right to be forgotten work package, the DPI service can log feedback received from responders and then proceed to send a check work package to at least some responder applications (e.g., per responder group processing). As another example, the feedback received from responders for the right to be forgotten work package can include information regarding purposes that have a processing ground of opt-out exceptional (e.g., opt-out after assessment). The DPI service can provide information for these purposes to an opt-out exceptional evaluator, which can be a data protection specialist and/or an automated engine that can provide, for example, an initial evaluation.

The opt-out exceptional evaluator can evaluate opt-out exceptional purposes with respect to information regarding reason(s) for a data subject opt-out, as an assessment as to whether the reason(s) provided by the data subject outweigh (or, for at least some jurisdictions, at least equal) factors pertinent to the data controller (or third parties) to continue the processing. As mentioned, the assessment can be done by a data protection specialist. Part of an overall assessment can be evaluating whether data controller has demonstrated compelling legal grounds (e.g., per Art. 21(1) GDPR).

As another example, certain rules can be configured in an automated opt-out exceptional evaluator (which can reside within the DPI service, and which can include or use artificial intelligence/self-learning algorithm(s) to automatically determine an initial assessment). The initial assessment can be provided to the data protection specialist, for confirmation and/or amendment. The automated opt-out exceptional evaluator can use historic and/or statistical data to generate the initial assessment. For example, for a specific type of purpose with an "opt out exceptional" purpose setting that has always (or nearly always) been removed after a human data protection specialist has assessed the opt-out, the automated opt-out evaluator may observe this pattern and determine a similar assessment for similar purposes for future evaluations. Additionally, the automated opt-out evaluator can be trained based on whether the data protection specialist confirms or amends automated initial assessments.

For a given purpose with an opt-out exceptional purpose setting, an assessment (whether by the data protection specialist and/or the automated engine) can be that the opt-out can apply for the purpose for the data subject (e.g., indicating that reason(s) for the opt-out outweigh reason(s) for the processing). Accordingly the opt-out exceptional evaluator can inform the DPI service of opt-out exceptional cases that should now be opt out. In response to such information, the DPI service can send a specific work package (e.g., a "disassociate purpose with opt-out exceptional" work package, with object instance identifiers and indications of purposes to disassociate) to applications. Applications can then do what is required to ensure that data is not processed for this purpose anymore. Additionally, an application can send a response to this work package to the DPI service indicating that the application confirms the request to handle the opt-out.

In general, similar processing for the method 300 can be performed for the APD protocol as for the iEoP protocol. Check work packages can instruct responders to vote on whether a purpose can be disassociated from an object, for example, rather than voting on whether an object can be blocked. When determining a can-disassociate vote or a cannot-disassociate vote, a responder can consider the purpose setting when determining the vote. For example, the responder can determine a can-disassociate vote for disassociating a purpose from an object if the work package corresponds to a right to be forgotten request and the purpose has a processing ground of opt-in or opt-out.

Figure 4:
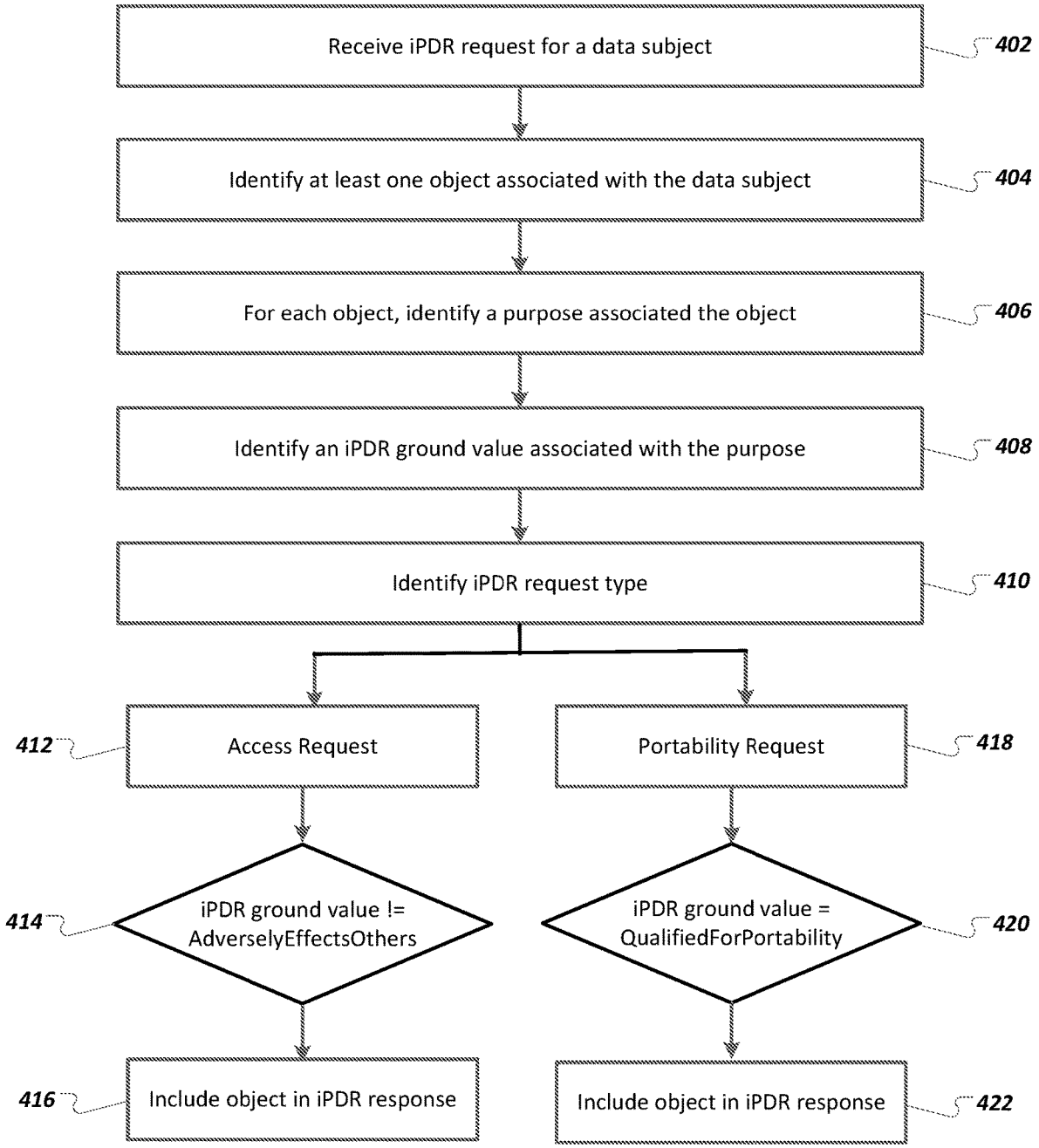
FIG. 4 is a flowchart of an example method for automating handling of data subject requests for data privacy integration protocols.

FIG. 4 is a flowchart 400 of an example method 400. At 402, an iPDR request is received (e.g., at a responder) for a data subject.

At 404, at least one object associated with the subject is identified.

At 406, for each object, a purpose associated with the object is identified.

At 408, an iPDR ground value associated with the purpose is identified.

At 410, an iPDR request type is identified.

At 412, the iPDR request type of an access request is identified.

At 414, the iPDR ground value is evaluated with respect to the access request. For example, a determination can be made as to whether the iPDR ground value is equal to an AdverselyEffectsOthers value. At 416, if the iPDR ground value is not equal to the AdverselyEffectsOthers value, the object (or information included in the object) can be included in the iPDR response.

As another example, at 418, a portability request type is identified. At 420, the iPDR ground value is evaluated with respect to the portability request type. For example, a determination can be made as to whether the iPDR ground value is equal to a QualifiedForPortability value. At 422, if the iPDR ground value is equal to the QualifiedForPortability value, the object (or information included in the object) can be included in the iPDR response.

Although processing a work package for a data subject is described, in some implementations, a work package might include multiple master data objects that represent different data subjects. In some cases, the work package includes different work package parameters for different objects. In other cases, the work package includes one work package parameter that applies to all objects in the work package. In some cases, the DPI service may receive a ticket that has different objects and different ticket parameters, and the DPI service may create multiple work packages, such as a first work package that include includes a first set of objects and a second work package that includes a second set of objects. The first work package can include a first work package parameter that is based on a first ticket parameter and that is applicable to the first set of objects. Similarly, the second work package can include a second work package parameter that is based on a second ticket parameter and that is applicable to the second set of objects.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

EXAMPLES

Example 1. A computer-implemented method comprising:
receiving, at a data privacy integration service, a ticket for performing a data privacy integration protocol for a data subject in a multi-application landscape, wherein the ticket includes a ticket parameter that affects processing of the ticket with respect to purpose information;

providing, by the data privacy integration service and in response to receiving the ticket, a work package to responder applications in the multi-application landscape that are requested to respond to the work package, wherein the work package includes a work package parameter that is based on the ticket parameter;

processing, by each responder application, the work package, wherein processing the work package by a respective responder application comprises:
  determining, by the responder application, for at least one object associated with the data subject, at least one purpose associated with the object;
  determining, by the responder application, for each determined purpose, a purpose setting that corresponds to the work package parameter; and
  processing, by the responder application, the work package for the data privacy integration protocol based on the work package parameter and purpose settings of the at least one purpose;

providing, by each responder application, feedback for the work package to the data privacy integration service; and processing, by the data privacy integration service, feedback from the responder applications, to continue the data privacy integration protocol for the ticket.

Example 2. The computer-implemented method of Example 1, wherein the ticket parameter is included in the ticket by a requesting application that creates and provides the ticket to the data privacy integration service, by an administrator of the data privacy integration service, or by an automated rule evaluator.

Example 3. The computer-implemented method of any one of the preceding examples, wherein the data privacy integration protocol is an integrated end-of-purpose protocol and the ticket parameter specifies whether the ticket corresponds to a right to be forgotten request for the data subject that requests removal of personal data for the data subject in the multi-application landscape.

Example 4. The computer-implemented method of any one of the preceding examples, wherein the work package is a check work package for the integrated end-of-purpose protocol that requests the responder applications to provide votes on whether personal data for the data subject can be blocked and wherein the work package parameter indicates that the check work package corresponds to the right to be forgotten request.

Example 5. The computer-implemented method of any one of the preceding examples, wherein the work package parameter instructs responder applications to, before providing votes, remove purposes, from personal data objects, for which: 1) the data subject has provided consent; or 2) the data subject can opt out.

Example 6. The computer-implemented method of any one of the preceding examples, wherein the work package parameter instructs responder applications to vote as if purposes have been removed, without actual removal of purposes, from personal data objects, for which 1) the data subject has provided consent; or 2) the data subject can opt out.

Example 7. The computer-implemented method of any one of the preceding examples, wherein the work package is a right to be forgotten work package, specific for the right to be forgotten request, that is sent to responder applications before a check work package is sent to the responder applications, wherein the work package parameter instructs the responder applications to remove purposes, from personal data objects, for which: 1) the data subject has provided consent; or 2) the data subject can opt out.

Example 8. The computer-implemented method of any one of the preceding examples, wherein the data privacy integration protocol is an integrated personal data retrieval protocol and the ticket parameter specifies whether the ticket corresponds to a right of data access or a right of data portability for personal data for the data subject in the multi-application landscape.

Example 9. The computer-implemented method of any one of the preceding examples, wherein the work package parameter specifies whether the work package corresponds to the right of data access or the right of data portability for the data subject.

Example 10. The computer-implemented method of any one of the preceding examples, wherein the purpose setting can be used to determine whether an object associated with the purpose should be included in a personal data export for the integrated personal data retrieval protocol.

Example 11. The computer-implemented method of any one of the preceding examples, wherein the purpose setting indicates whether the object qualifies for data portability or if exporting the object would adversely affect individuals other than the data subject.

Example 12. The computer-implemented method of any one of the preceding examples, wherein the purpose setting comprises a processing ground that can specify, independent of particular legislation, a ground for processing data according to a defined purpose.

Example 13. The computer-implemented method of any one of the preceding examples, wherein the processing ground specifies whether a purpose applies if the data subject has opted in to processing for the purpose, the purpose applies unless the data subject has opted out of processing for the purpose, the purpose applies unless the data subject has opted out of processing for the purpose and an assessment of an opt out request is approved, processing for the purpose is required by a data controller, or processing for the purpose is allowed for the data controller.

Example 14. The computer-implemented method of any one of the preceding examples, wherein the data privacy integration protocol is an integrated end-of-purpose protocol, the work package is a right to be forgotten work package, and processing, by responder applications, the work package for the data privacy integration protocol based on the work package parameter and purpose settings of the at least one purpose comprises the responder applications removing, from objects, purposes that have a purpose setting indicating that the purpose applies if the data subject has opted in to processing for the purpose or that the purpose applies unless the data subject has opted out of processing for the purpose.

Example 15. The computer-implemented method of any one of the preceding examples, wherein the data privacy integration protocol is an integrated end-of-purpose protocol, the work package is a check work package, and processing, by responder applications, the work package for the data privacy integration protocol based on the work package parameter and purpose settings of the at least one purpose comprises responder applications, before determining a local end-of-purpose vote for an object, removing, from the object, purposes that have a purpose setting indicating that the purpose applies if the data subject has opted in to processing for the purpose or that the purpose applies unless the data subject has opted out of processing for the purpose.

Example 16. The computer-implemented method of any one of the preceding examples, wherein the data privacy integration protocol is an integrated end-of-purpose protocol, the work package is a check work package, and processing, by responder applications, the work package for the data privacy integration protocol based on the work package parameter and purpose settings of the at least one purpose comprises responder applications, when determining a local end-of-purpose vote for an object, considering, without removing purposes, that purposes have been removed from the object that have a purpose setting indicating that the purpose applies if the data subject has opted in to processing for the purpose or that the purpose applies unless the data subject has opted out of processing for the purpose.

Example 17. The computer-implemented method of any one of the preceding examples, wherein the data privacy integration protocol is an integrated personal data retrieval protocol and processing, by responder applications, the work package for the data privacy integration protocol based on the work package parameter and purpose settings of the at least one purpose comprises responder applications identifying a data object for personal data export if 1) the work package parameter indicates the ticket is for a personal data access request and no purpose setting of a purpose for the object indicates that exporting the data object would adversely affect individuals other than the data subject; or 2) the work package parameter indicates the ticket is for a portability request and a purpose setting of a purpose for the object indicates that the object is qualified for portability.

Example 18. A system comprising:
one or more computers; and
a computer-readable medium coupled to the one or more computers having instructions stored thereon which, when executed by the one or more computers, cause the one or more computers to perform operations comprising:
  receiving, at a data privacy integration service, a ticket for performing a data privacy integration protocol for a data subject in a multi-application landscape, wherein the ticket includes a ticket parameter that affects processing of the ticket with respect to purpose information;
  providing, by the data privacy integration service and in response to receiving the ticket, a work package to responder applications in the multi-application landscape that are requested to respond to the work package, wherein the work package includes a work package parameter that is based on the ticket parameter;
  processing, by each responder application, the work package, wherein processing the work package by a respective responder application comprises:
    determining, by the responder application, for at least one object associated with the data subject, at least one purpose associated with the object;
    determining, by the responder application, for each determined purpose, a purpose setting that corresponds to the work package parameter; and
    processing, by the responder application, the work package for the data privacy integration protocol based on the work package parameter and purpose settings of the at least one purpose;
  providing, by each responder application, feedback for the work package to the data privacy integration service; and
  processing, by the data privacy integration service, feedback from the responder applications, to continue the data privacy integration protocol for the ticket.

Example 19. The system of Example 18, wherein the ticket parameter is included in the ticket by a requesting application that creates and provides the ticket to the data privacy integration service, by an administrator of the data privacy integration service, or by an automated rule evaluator.

Example 20. A computer program product encoded on a non-transitory storage medium, the product comprising non-transitory, computer readable instructions for causing one or more processors to perform operations comprising:
  receiving, at a data privacy integration service, a ticket for performing a data privacy integration protocol for a data subject in a multi-application landscape, wherein the ticket includes a ticket parameter that affects processing of the ticket with respect to purpose information;
  providing, by the data privacy integration service and in response to receiving the ticket, a work package to responder applications in the multi-application landscape that are requested to respond to the work package, wherein the work package includes a work package parameter that is based on the ticket parameter;
  processing, by each responder application, the work package, wherein processing the work package by a respective responder application comprises:
    determining, by the responder application, for at least one object associated with the data subject, at least one purpose associated with the object;
    determining, by the responder application, for each determined purpose, a purpose setting that corresponds to the work package parameter; and
    processing, by the responder application, the work package for the data privacy integration protocol based on the work package parameter and purpose settings of the at least one purpose;
  providing, by each responder application, feedback for the work package to the data privacy integration service; and
  processing, by the data privacy integration service, feedback from the responder applications, to continue the data privacy integration protocol for the ticket.

What is claimed is:
1. A computer-implemented method comprising:
receiving, at a data privacy integration service, a ticket for performing a data privacy integration protocol for a data subject in a multi-application landscape, wherein the ticket includes a ticket parameter that affects processing of the ticket with respect to purpose information;
providing, by the data privacy integration service and in response to receiving the ticket, a work package to responder applications in the multi-application landscape that are requested to respond to the work package, wherein the work package includes a work package parameter that is based on the ticket parameter;
processing, by each responder application, the work package, wherein processing the work package by a respective responder application comprises:
  determining, by the responder application, for at least one object associated with the data subject, at least one purpose associated with the object;

determining, by the responder application, for each determined purpose, a purpose setting that corresponds to the work package parameter; and processing, by the responder application, the work package for the data privacy integration protocol based on the work package parameter and purpose settings of the at least one purpose;

providing, by each responder application, feedback for the work package to the data privacy integration service; and processing, by the data privacy integration service, feedback from the responder applications, to continue the data privacy integration protocol for the ticket.

2. The computer-implemented method of claim 1, wherein the ticket parameter is included in the ticket by a requesting application that creates and provides the ticket to the data privacy integration service, by an administrator of the data privacy integration service, or by an automated rule evaluator.

3. The computer-implemented method of claim 1, wherein the data privacy integration protocol is an integrated end-of-purpose protocol and the ticket parameter specifies whether the ticket corresponds to a right to be forgotten request for the data subject that requests removal of personal data for the data subject in the multi-application landscape.

4. The computer-implemented method of claim 3, wherein the work package is a check work package for the integrated end-of-purpose protocol that requests the responder applications to provide votes on whether personal data for the data subject can be blocked and wherein the work package parameter indicates that the check work package corresponds to the right to be forgotten request.

5. The computer-implemented method of claim 4, wherein the work package parameter instructs responder applications to, before providing votes, remove purposes, from personal data objects, for which: 1) the data subject has provided consent; or 2) the data subject can opt out.

6. The computer-implemented method of claim 4, wherein the work package parameter instructs responder applications to vote as if purposes have been removed, without actual removal of purposes, from personal data objects, for which 1) the data subject has provided consent; or 2) the data subject can opt out.

7. The computer-implemented method of claim 4, wherein the work package is a right to be forgotten work package, specific for the right to be forgotten request, that is sent to responder applications before a check work package is sent to the responder applications, wherein the work package parameter instructs the responder applications to remove purposes, from personal data objects, for which: 1) the data subject has provided consent; or 2) the data subject can opt out.

8. The computer-implemented method of claim 1, wherein the data privacy integration protocol is an integrated personal data retrieval protocol and the ticket parameter specifies whether the ticket corresponds to a right of data access or a right of data portability for personal data for the data subject in the multi-application landscape.

9. The computer-implemented method of claim 8, wherein the work package parameter specifies whether the work package corresponds to the right of data access or the right of data portability for the data subject.

10. The computer-implemented method of claim 8, wherein the purpose setting can be used to determine whether an object associated with the purpose should be included in a personal data export for the integrated personal data retrieval protocol.

11. The computer-implemented method of claim 8, wherein the purpose setting indicates whether the object qualifies for data portability or if exporting the object would adversely affect individuals other than the data subject.

12. The computer-implemented method of claim 1, wherein the purpose setting comprises a processing ground that can specify, independent of particular legislation, a ground for processing data according to a defined purpose.

13. The computer-implemented method of claim 12, wherein the processing ground specifies whether a purpose applies if the data subject has opted in to processing for the purpose, the purpose applies unless the data subject has opted out of processing for the purpose, the purpose applies unless the data subject has opted out of processing for the purpose and an assessment of an opt out request is approved, processing for the purpose is required by a data controller, or processing for the purpose is allowed for the data controller.

14. The computer-implemented method of claim 1, wherein the data privacy integration protocol is an integrated end-of-purpose protocol, the work package is a right to be forgotten work package, and processing, by responder applications, the work package for the data privacy integration protocol based on the work package parameter and purpose settings of the at least one purpose comprises the responder applications removing, from objects, purposes that have a purpose setting indicating that the purpose applies if the data subject has opted in to processing for the purpose or that the purpose applies unless the data subject has opted out of processing for the purpose.

15. The computer-implemented method of claim 1, wherein the data privacy integration protocol is an integrated end-of-purpose protocol, the work package is a check work package, and processing, by responder applications, the work package for the data privacy integration protocol based on the work package parameter and purpose settings of the at least one purpose comprises responder applications, before determining a local end-of-purpose vote for an object, removing, from the object, purposes that have a purpose setting indicating that the purpose applies if the data subject has opted in to processing for the purpose or that the purpose applies unless the data subject has opted out of processing for the purpose.

16. The computer-implemented method of claim 1, wherein the data privacy integration protocol is an integrated end-of-purpose protocol, the work package is a check work package, and processing, by responder applications, the work package for the data privacy integration protocol based on the work package parameter and purpose settings of the at least one purpose comprises responder applications, when determining a local end-of-purpose vote for an object, considering, without removing purposes, that purposes have been removed from the object that have a purpose setting indicating that the purpose applies if the data subject has opted in to processing for the purpose or that the purpose applies unless the data subject has opted out of processing for the purpose.

17. The computer-implemented method of claim 1, wherein the data privacy integration protocol is an integrated personal data retrieval protocol and processing, by responder applications, the work package for the data privacy integration protocol based on the work package parameter and purpose settings of the at least one purpose comprises responder applications identifying a data object for personal data export if 1) the work package parameter indicates the ticket is for a personal data access request and no purpose setting of a purpose for the object indicates that exporting the data object would adversely affect individuals other than the data subject; or 2) the work package parameter indicates the ticket is for a portability request and a purpose setting of a purpose for the object indicates that the object is qualified for portability.

18. A system comprising:
one or more computers; and
a computer-readable medium coupled to the one or more computers having instructions stored thereon which, when executed by the one or more computers, cause the one or more computers to perform operations comprising:
receiving, at a data privacy integration service, a ticket for performing a data privacy integration protocol for a data subject in a multi-application landscape, wherein the ticket includes a ticket parameter that affects processing of the ticket with respect to purpose information;
providing, by the data privacy integration service and in response to receiving the ticket, a work package to responder applications in the multi-application landscape that are requested to respond to the work package, wherein the work package includes a work package parameter that is based on the ticket parameter;
processing, by each responder application, the work package, wherein processing the work package by a respective responder application comprises:
determining, by the responder application, for at least one object associated with the data subject, at least one purpose associated with the object;
determining, by the responder application, for each determined purpose, a purpose setting that corresponds to the work package parameter; and
processing, by the responder application, the work package for the data privacy integration protocol based on the work package parameter and purpose settings of the at least one purpose;
providing, by each responder application, feedback for the work package to the data privacy integration service; and
processing, by the data privacy integration service, feedback from the responder applications, to continue the data privacy integration protocol for the ticket.

19. The system of claim 18, wherein the ticket parameter is included in the ticket by a requesting application that creates and provides the ticket to the data privacy integration service, by an administrator of the data privacy integration service, or by an automated rule evaluator.

20. A computer program product encoded on a non-transitory storage medium, the product comprising non-transitory, computer readable instructions for causing one or more processors to perform operations comprising:
receiving, at a data privacy integration service, a ticket for performing a data privacy integration protocol for a data subject in a multi-application landscape, wherein the ticket includes a ticket parameter that affects processing of the ticket with respect to purpose information;
providing, by the data privacy integration service and in response to receiving the ticket, a work package to responder applications in the multi-application landscape that are requested to respond to the work package, wherein the work package includes a work package parameter that is based on the ticket parameter;
processing, by each responder application, the work package, wherein processing the work package by a respective responder application comprises:
determining, by the responder application, for at least one object associated with the data subject, at least one purpose associated with the object;
determining, by the responder application, for each determined purpose, a purpose setting that corresponds to the work package parameter; and
processing, by the responder application, the work package for the data privacy integration protocol based on the work package parameter and purpose settings of the at least one purpose;
providing, by each responder application, feedback for the work package to the data privacy integration service; and
processing, by the data privacy integration service, feedback from the responder applications, to continue the data privacy integration protocol for the ticket.

* * * * *